May 19, 1964  R. WESTLEY  3,133,412
JET NOISE SUPPRESSION MEANS AND THRUST REVERSER
Filed Aug. 25, 1958  7 Sheets-Sheet 1

INVENTOR
Robert Westley
BY
Stevens, Davis, Miller & Mosher
his ATTORNEYS

May 19, 1964 R. WESTLEY 3,133,412
JET NOISE SUPPRESSION MEANS AND THRUST REVERSER
Filed Aug. 25, 1958 7 Sheets-Sheet 2

INVENTOR
Robert Westley
BY
Stevens, Davis, Miller & Mosher
his ATTORNEYS

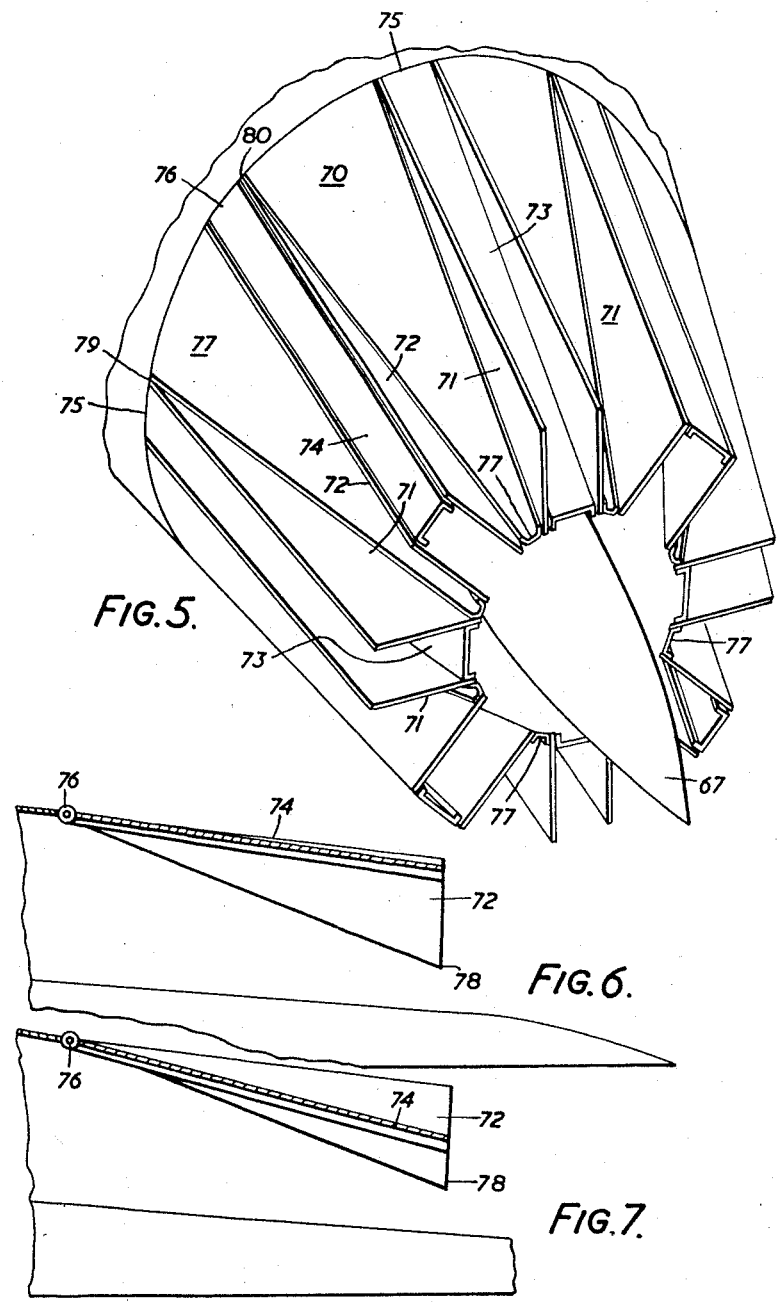

May 19, 1964 R. WESTLEY 3,133,412
JET NOISE SUPPRESSION MEANS AND THRUST REVERSER
Filed Aug. 25, 1958 7 Sheets-Sheet 5

INVENTOR
Robert Westley
BY
his ATTORNEYS

May 19, 1964 R. WESTLEY 3,133,412
JET NOISE SUPPRESSION MEANS AND THRUST REVERSER
Filed Aug. 25, 1958 7 Sheets-Sheet 6
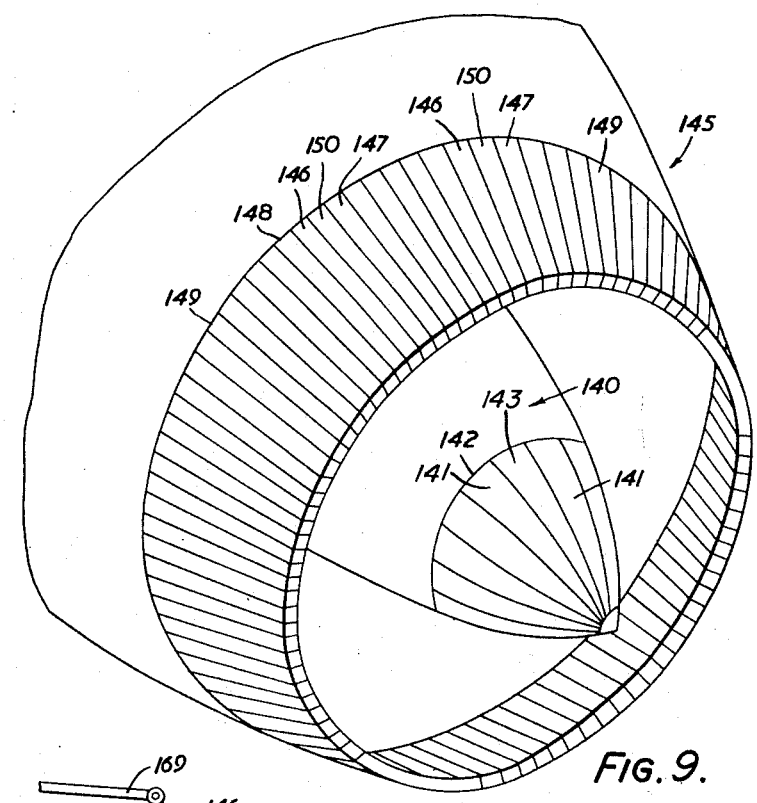
FIG. 9.
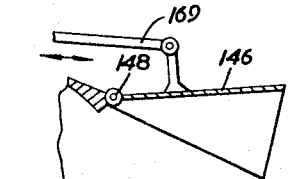
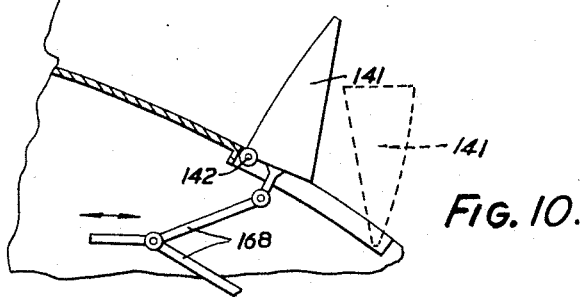
FIG. 10.
INVENTOR
Robert Westley
BY
Stevens, Davis, Miller & Mosher
his ATTORNEYS May 19, 1964 R. WESTLEY 3,133,412
JET NOISE SUPPRESSION MEANS AND THRUST REVERSER
Filed Aug. 25, 1958 7 Sheets-Sheet 7

INVENTOR
BY Robert Westley
By Stevens, Davis, Miller & Mosher
ATTORNEYS

United States Patent Office 3,133,412
Patented May 19, 1964

3,133,412
JET NOISE SUPPRESSION MEANS AND THRUST REVERSER
Robert Westley, 15½ 4th Ave., Ottawa, Ontario, Canada
Filed Aug. 25, 1958, Ser. No. 756,962
Claims priority, application Canada Aug. 30, 1957
8 Claims. (Cl. 60—35.54)

The present invention relates to a noise suppression means for the reduction of the jet noise from jet propulsion engines. The invention also relates to a combined noise suppressor and thrust reverser for jet engines.

According to the present invention a noise suppression device for reducing the noise of a propulsive gas stream of an aircraft jet propulsion engine comprises a plurality of elements capable of at least partially corrugating or breaking up the flow of said stream, which elements are located at or in the vicinity of, the exit of the said stream from the engine and which are adapted to be moved into and out of the stream.

The invention also provides a noise suppressing nozzle through which the propulsive gas stream of an aircraft jet propulsion engine is to be issued, which nozzle is provided with peripheral corrugations and means for altering the spatial position of the corrugations relative to the said gas stream to present a nozzle of variable shape thereto.

According to a further feature of the invention, a combined noise suppressing nozzle and thrust reverser adapted to be located in the propulsive gas stream of an aircraft jet propulsion engine at or in the vicinity of the exit of the said stream from the engine comprises a nozzle having a plurality of peripheral corrugations and means for orienting the spatial position of the corrugations relative to the said gas stream in at least three positions, namely: an "in flight" position of substantially streamlined airflow over the outside and inside of the nozzle; a noise suppressing position in which the corrugations are in stream breakup contact with the said gas stream to corrugate it; and, a thrust reversing position in which the corrugations on the nozzle act to reverse the direction of at least a substantial part of the said gas stream.

According to a still further feature of the invention a noise suppression device comprises a plurality of stream deflectors adapted to be retracted into or substantially flush with the exhaust cone or bullet of a jet propulsion engine and extended outwardly from the bullet into the jet stream to corrugate it for noise suppression.

The following is a description by way of example of certain embodiments in accordance with the invention, reference being made to the accompanying drawings, in which:

FIGURE 1 is a perspective view of a corrugated noise suppressor shown in the "in flight" position with the silencer retracted;

FIGURE   is a perspective view of a noise suppressor of alternative configuration, the silencer being shown in operation;

FIGURE 5 is a perspective view of an alternative form of combined thrust reverser and retractable noise suppressor, the noise suppressor being shown in operation;

FIGURE 6 is a partial cross-sectional side elevation shown showing the silencer of FIGURE 5 in silencing condition;

FIGURE 7 is a view of the same element as illustrated in FIGURE 6 shown in the cruising or "in flight" position;

FIGURE 9 is a perspective view of an alternative silencing device;

FIGURE 10 is a partial side elevation in section of the silencer of FIGURE 9 showing means for operating the silencer;

Figure 1:
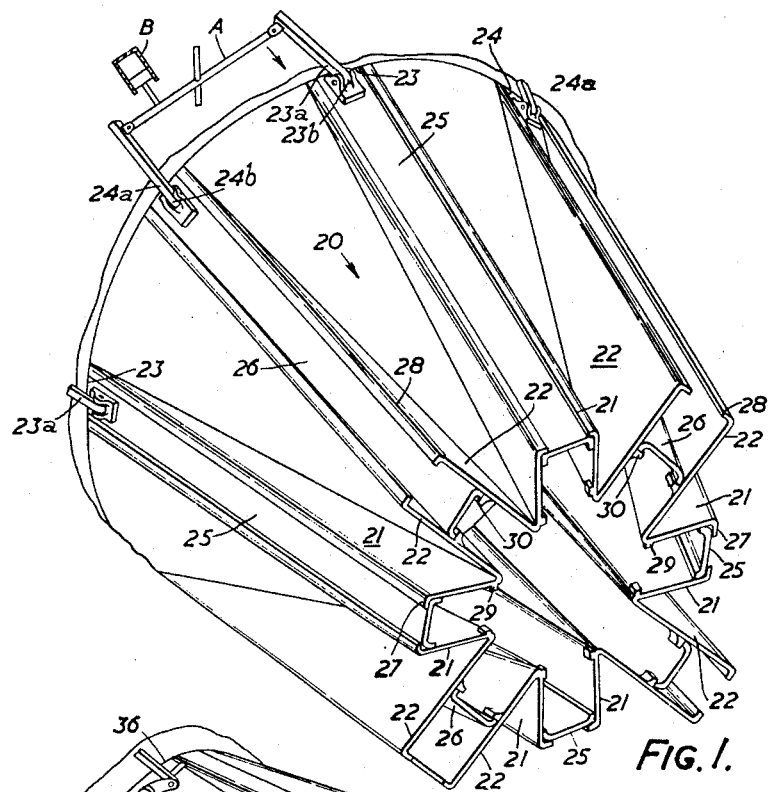

Referring now to FIGURE 1, a substantially frusto-conical nozzle 20 forms the exit part of the jet pipe of a jet propulsion engine. The general exterior effect of the nozzle is one of convergency although it will be appreciated by one skilled in the art that the invention would be equally applicable to an externally diverging nozzle. Equally spaced about the nozzle are a plurality of pairs of side wall elements 21 and 22; the side walls 21 and 22 are fixed in relation to the engine. Hinged at the upstream end of the nozzle at 23 and 24 are a plurality of web-like elements 25, 26 one arranged within each pair of side walls. Each pair of side walls is provided with stop members 27, 29 and 28, 30. The stop members limit the distance of travel inwardly and outwardly of the web elements 25 and 26 about their hinge points 23 and 24. As shown the nozzle is in the non-silencing position, that is to say in the "in flight" or cruising position, the web members 26 resting against their inner stops 30 and the web members 25 resting against their outer stops 27. In this position the web members take up a position of equal spacing from the centre of the jet stream presenting thereto a substantially circular cross-section opening at the exit plane of the nozzle broken only by the bottom portions of the side walls 21 and 22. In this position insufficient silencing takes place but the general aerodynamic streamlining for the inside and outside of the nozzle is good. Each of the web elements 25 and 26 are connected respectively through lever arms 23b and 24b to rods 23a and 24a (only one pair of lever arms is shown in FIGURE 1). A pivotable cross linkage A is connected to the rods 23a and 24a. A jack B is shown for pivoting the cross linkage A.

When the silencer is to be brought into effect, for example on take-off or landing, the web members 26 are moved outwardly about their hinge points 24 by pivoting the cross linkage A so that the rod 24a moves in the direction indicated by the arrow. The web members 26 then abut with the outer stops 28 on the side walls 22. The web members 25 are moved inwardly about their hinge points 23 into abutment with their inner stops 29 by the rod 23a which moves in the direction indicated by the arrow. This produces a satisfactory decrease in jet noise without substanital decrease in the effective nozzle exit area. The fact that the effective nozzle exit area is maintained substantially the same whether or not the silencer is operating, permits the engine to operate efficiently and eliminates any tendency for the temperature of the jet pipe to increase.

Figure 2:
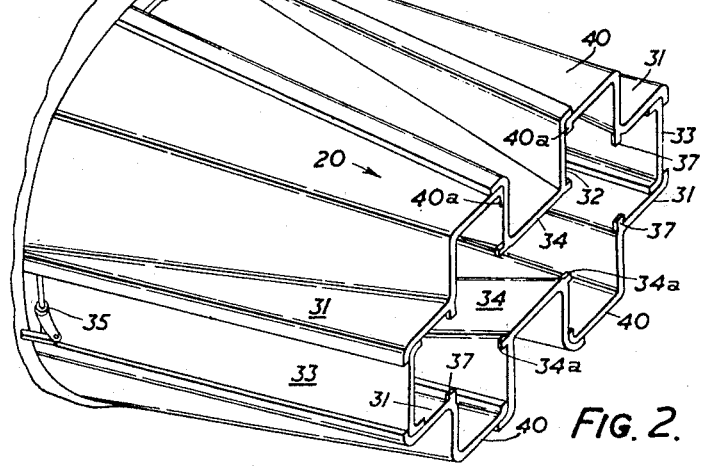
FIGURES 2A and 2B show diagrammatically arrangements for retracting the noise suppressor.

In FIGURE 2 there is shown an alternative form of configuration of jet nozzle embodying the features of the invention of the construction shown in FIGURE 1. The general configuration of the exit plane of the nozzle 20 is rectangular. A pair of outwardly extending side wall elements 31 are located on opposite lateral sides of the rectangle and a pair of inwardly directed side wall elements 32 are arranged on the other two opposite lateral sides of the rectangle. The inwardly directed side walls 32 are united by an integral web 34 to form a channel-like configuration. The side wall elements 31 are provided with transversely extending web-like members 33 which are pivoted at 35. The channel-like members made up of the side walls 32 and the transverse web member 34 are hinged at 36 and adapted to rotate about the hinge as a unit. In FIGURE 2 the silencer is shown in operative position.

During flight the silencer is retracted by rocking the web-like elements 33 about their hinges 35 so that they abut against inner stops 37 and the channel-like units are rotated outwardly about their hinge points 36 until their webs 34 are substantially in line with the lateral faces 40 of the jet nozzle. Stops 34a on the web 34 abut against stops 40a on the faces 40 of the nozzle. The mechanism for retracting the silencer is similar to that shown in FIGURE 1 of the drawings. The exit area, when the silencer is retracted, presents to the propulsive stream, at the point of exit, a generally rectangular configuration. As with the embodiment shown in FIGURE 1 the cross sectional area of the propulsive stream is substantially the same at the exit area whether or not the noise suppressor is in operation.

Figure 2A:
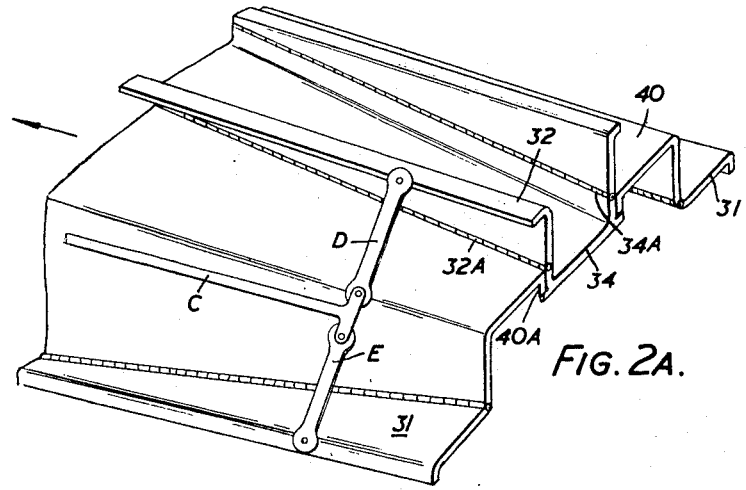
Figure 2B:
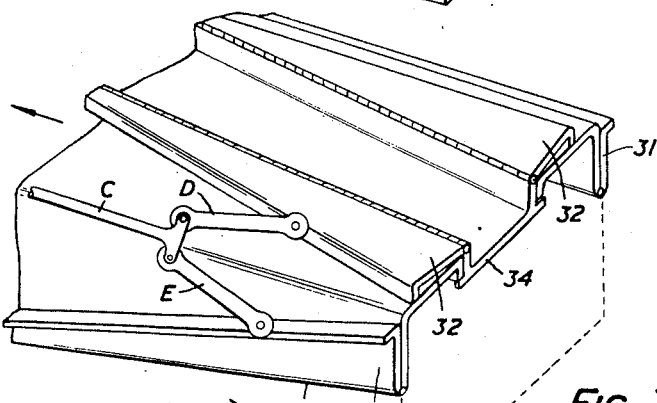

FIGURES 2A and 2B show diagrammatically arrangements by which the side walls 31 and 32 can be arranged to fold sideways onto the nozzle 20 when the silencer is in a retracted position, thereby reducing the external drag. In FIGURE 2A, two linkages D and E are pivotably connected to the side walls 31 and 32 which are foldable about hinges 31a and 32a respectively. The linkages are both pivotably connected to control rod C. FIGURE 2A shows the walls 31 and 32 in an unfolded condition. FIGURE 2B shows the walls 31 and 32 in their folded condition which is brought about by the movement of the control rod C in the direction shown by the arrow. Although not shown in FIGURES 2A and 2B the remaining hinged walls will be folded by linkages and control rods in the same way as walls 31 and 32. In the folded condition the nozzle approximates to a conventional uncorrugated nozzle.

Figure 4:
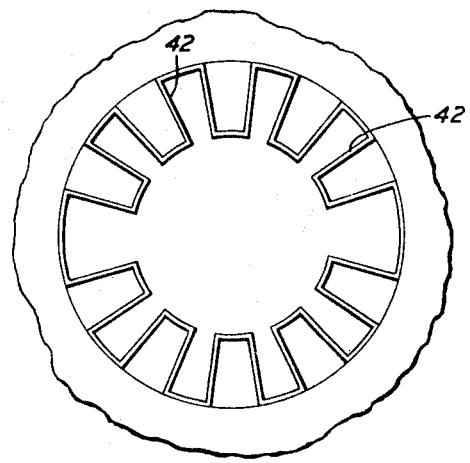
FIGURE 4 is an end elevation of the embodiment shown in FIGURE 3, one configuration of nozzle being illustrated.
Figure 3:
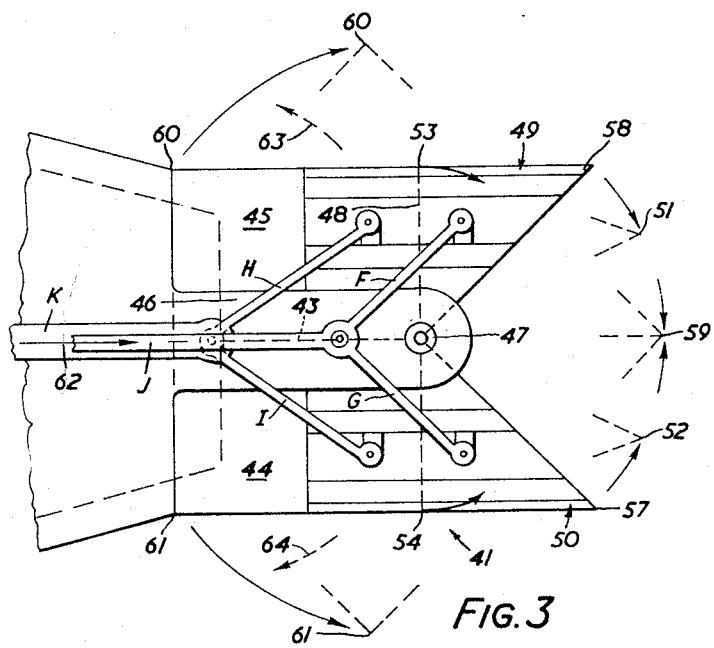
FIGURE 3 is a plan view of a combined noise suppressor and thrust reverser.
Figure 3A:
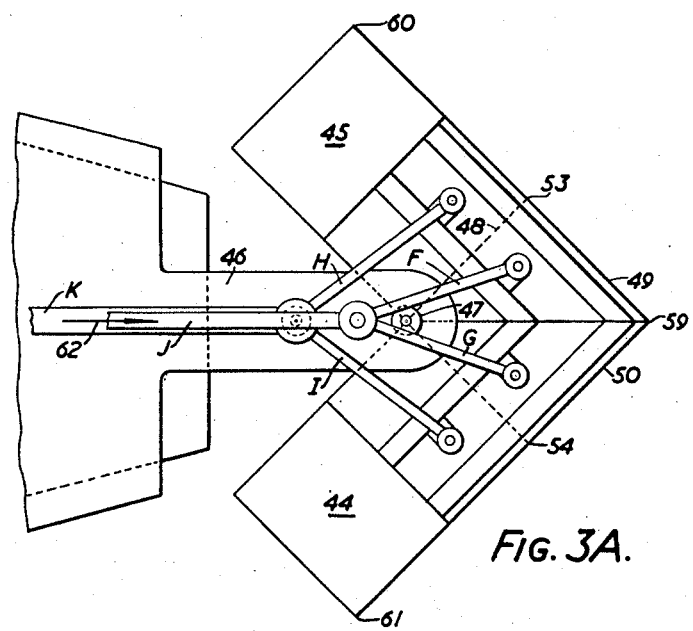
FIGURE 3A is a more detailed view of a combined noise suppressor and thrust reverser in the thrust reversing position.

FIGURES 3 and 4 show a combined noise suppressor and thrust reverser 1, the nozzle whereof is of substantially cylindrical configuration having a plurality of corrugations 42 around the periphery thereof. The mouth of the nozzle is cut away to form what is known as a clam shell device. The nozzle is split longitudinally at 43 dividing the nozzle into two half nozzles 44 and 45. The two half nozzles are mounted on a pair of diametrically spaced supporting arms 46 and the two half nozzles are pivoted at 47. The two half nozzles are again sub-divided by a transverse split 48 extending across the nozzle and passing through the pivot 47 whereby two visor-like elements 49 and 50 are formed. The visor-like elements are pivoted about 47 to swing inwardly to points 51 and 52 to cause a silencing effect. When the silencer is in operation the upstream ends 53, 54 of the visors 49, 50 do not effectively project outwardly into the airstream about the engine nacelle. When the thrust reverser is to be brought into effect, the two half nozzles 44 and 45 including the visors 49 and 50 are moved until the outermost tips 57 and 58 of the two half nozzles meet at the point 59. In this position the upstream ends 60 and 61 of the two half nozzles extend outwardly into the airstream as shown in FIGURE 3A. It will be obvious that the propulsive stream from the engine travelling initially as indicated by the arrow 62 is reversed by coming into contact with the inner face of the two half nozzles and is thus deflected and reversed so that it exhausts as shown by the arrows 63 and 64. The reversed thrust of the jet engine is therefore utilized to brake the aircraft on landing and thereby reduce the length of run necessary to make a safe landing.

The noise suppressing visors 49 and 50 have linkages F and G pivotably connected to them, the linkages being connected to a rod J. The upstream parts of the half nozzles 44 and 45 are pivotally connected to linkages I and H respectively. These linkages are connected to a hollow rod K which surrounds the rod J. For noise suppression purposes the rod J is moved in a direction to the left hand side of FIGURE 3 thus placing the noise suppression visors 49 and 50 so that their downstream ends 57 and 58 are in the positions 51 and 52 respectively. For thrust reversal purposes both rods J and K are moved towards the left hand side of FIGURE 3 so that the upstream ends of the half nozzles 60 and 61 take up the position as shown in FIGURE 3A and the downstream ends of the nozzle 57 and 58 meet at the point 59.

Although FIGURE 4 shows the exit area of the nozzle of substantially circular cross-section it will be appreciated that it could be of rectangular or other configuration.

Turning now to FIGURES 5, 6, 7 and 8. In these figures there is illustrated a combined noise suppressor and thrust reverser arranged around the exit bullet of a jet propulsion engine. The nozzle 70 is of generally frusto-conical configuration and as with the embodiment shown in FIGURE 1 is provided with a plurality of pairs of outwardly extending side wall elements 71 and 72 in which web-like elements, 73, 74 are pivoted at 75 and 76 for inward and outward movement relative to the bullet 67 within the pairs of side walls 71 and 72. Spacing the pairs of walls 71 and 72 are intermediate lands 77. The lands 77 may be fixed. In FIGURE 5 the nozzle is shown operating as a noise suppressor. As with the embodiment of FIGURE 1 the web-like elements 73 and 74 are moved alternately inwardly and outwardly to provide the operation of the noise suppressor, and take up a medial position within the pairs of side walls 71 and 72 for the "in flight" position.

FIGURE 6 shows the web element 74 in silencing position extended upwardly about its pivot 76 within the side walls 72.

FIGURE 7 shows the same web-like element 74 at its medial position within the side walls 72 for cruising or "in flight" position.

Figure 8A:
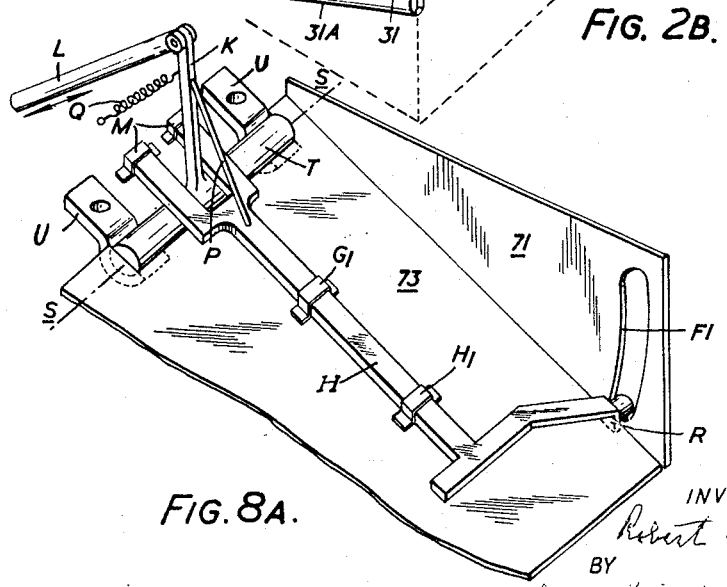
FIGURE 8A shows diagrammatically an arrangement for changing the silencer as shown in FIGURE 5 from a noise suppressing position, to a retracted position and to a thrust reversing position.
Figure 8:
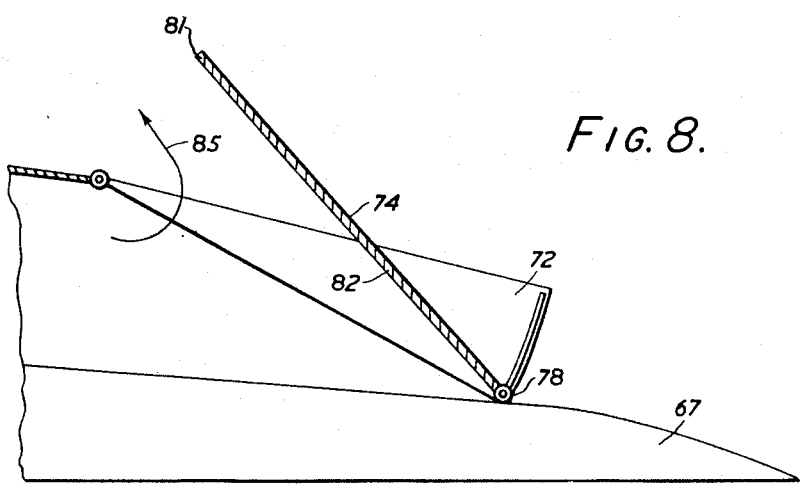
FIGURE 8 is a view similar to FIGURES 6 and 7, but showing the device arranged for thrust reversal.

As a thrust reverser, see FIGURE 8, the pairs of side walls 71, 72 are moved inwardly about pivot points 79 and 80 until the innermost tip 78 of the downstream edge of the walls 71, 72 abuts against the bullet 67. All the web elements 73, 74 which swing to touch the bullet 67, are disconnected from the hinge points 75, 76 and rocked about a hinge at the points 78 (shown only for the web element 74 but similarly arranged for the web element 73) of the side wall members 72, 71. The upstream ends 81 of the webs 73, 74 are therefore projected outwardly into the airstream about the engine nacelle. A substantial part of the propulsive jet stream is consequently deflected against the inner surfaces 82 of the elements 73 and 74 so that a substantial part of the stream follows the path of the arrow indicated at 85 causing thrust reversal. A portion of the propulsive stream will escape through the plurality of triangular shaped orifices produced between the outer faces of adjacent side wall elements 71 and 72 and the underside of the intermediate land 77. However, the greater part of the thrust will be reversed and a braking effect will be induced. Flaps (not shown) may in some instances be provided to close the triangular shaped orifices.

FIGURE 8A shows diagrammatically an arrangement for moving the flaps 73 and 74 into a cruising position, a noise suppression position or a thrust reversing position. FIGURE 8A shows the arrangement for moving a flap 73 but the same arrangement can be used for either of the flaps 73 or 74. The flap 73 is connected to a shaft T which projects above and below the surfaces of the flap. Half bearings U support the shaft T. A fork member H passes through slide members $G^1$, and $H^1$, which are attached to the upper surface of the flap 73. The ends of the fork part of the member H pass under a pair of slide members M. The downstream end of the member H is formed as a T piece the outer ends of the T passing through a guide slot F1 in the side walls 71, one only of which is shown in FIGURE 8A. At the lower edge of the guide slot F1 is a pivot R which is engaged by the outer ends of the T piece of the member H. A rod K is connected to the shaft T and a linkage P connected between the rod K and the fork member H. Q is a return spring to assist the return of the flap 73 into its upper position. An operating rod L is pivotably attached to the rod K.

Movement of the operating rod L towards the right hand of FIGURE 8A, depresses the flap, the linkage P pulls the fork member H out of the slides M and the T shaped end of the fork member H engages in the pivot R. The flap 73 is now free at its upstream end to pivot about R and to be placed by further movement of the operating rod L into a thrust reversing position.

It will be seen that the construction in accordance with FIGURES 5 through 8 produces when used as a noise suppressor all the advantages of the embodiment shown in FIGURE 1 with the additional advantage of thrust reversal.

Figure 11:
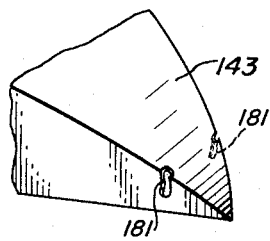
FIGURE 11 is a detailed view of an immovable segment of the bullet portion of the silencer modified to cooperate with the means of FIGURE 10A.
Figure 9A:
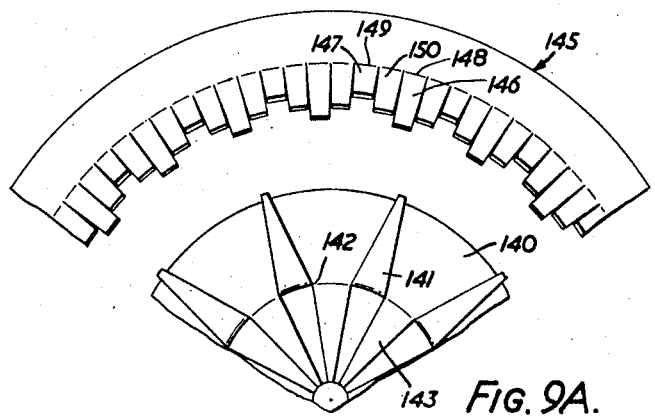
FIGURE 9A illustrates the silencing position of the silencer shown in FIG. 9.

In FIGURES 9, 10 and 11 there is shown a further embodiment of the invention in which a noise suppression device is provided in the bullet 140 to corrugate the jet by means other than the external nozzle. Circumferentially spaced around the nose of the bullet are a plurality of wedge-like elements or segments 141. The segments 141 are pivoted at 142 within the bullet. Control rods 168 connected to the segments 141 are operable to swing the segments outwardly from the bullet into the jet stream to produce a noise suppression effect. The segments 141 are equally spaced apart by fixed segments 143 of equal dimension to the segments 141.

In a further embodiment of the invention the segmented bullet may be utilized in combination with a nozzle generally indicated at 145 (FIGURE 9). The nozzle is provided with a plurality of tooth-like members 146, 147 which are pivotable inwardly and outwardly about hinges 148, 149 by control rods 169, so that the members 146, move outwardly and the members 147 move inwardly, thereby presenting a serrated nozzle to the boundary of the stream of propulsion gas. The tooth-like members 146, 147 are spaced apart as shown by fixed tooth-like members 160 which may be of any suitable width or in certain circumstances may be dispensed with. As an example there may be twice the number of tooth-like members 146, 147 as there are segments 141 in the bullet. It is to be understood that the segmented bullet could be utilized with advantage with any other form of nozzle for example a corrugated nozzle.

The operation of the bullet arrangement illustrated in FIGURES 9 to 11 as a thrust reverser will now be described with reference to FIGURE 10A. This figure shows an arrangement for pivoting the segments 141 about the downstream end of the bullet and is very similar to the arrangement shown in FIGURE 8A which is concerned with pivoting the flaps 73. The mechanism shown in FIGURE 10A can be operated to place the segments 141 in either a noise suppression position, a thrust reversing position or a streamline position and consequently with this mechanism, the control rods 168 shown in FIGURE 10 for placing the segments in a noise suppression position are not required. Each segment 141 is provided with a shaft 175 which is the equivalent of pivot 142 in FIGURE 10. The shaft 175 is supported in half bearings 176. A fork member 177 passes through slide members 178 and 179 which are attached to the upper surface of each segment 141. The ends of the fork member 177 pass under a pair of slide members 179. The downstream end of the fork member 177 is formed as a T piece, the outer ends of the T piece being provided with pivot pins 180 only one of which is shown in the drawings. The pins 180 are adapted to drop into slots 181 formed in the surface of stationary segments 143 of the nozzle bullet which segments 143 are intermediate the segments 141. Only one of these stationary segments 143 are shown in detail (FIG. 11) and this is shown more widely separated from the segment 141 than it would be in actual practice. A rod 182 is connected to the shaft 175 and a linkage 183 is connected between the rod 182 and the fork member 177. A return spring 184 assists the return of the segment 141 into the position in which the shaft 175 rests in the half bearings 176. An operating rod 185 is pivotably attached to the rod 182.

Figure 10A:
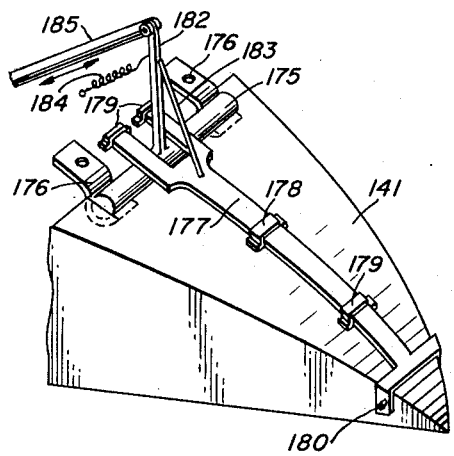
FIGURE 10A shows diagrammatically different means for operating the bullet portion of the silencer of FIGURE 9.

Assuming the segment 141 to be in the position shown in full line in FIGURE 10 i.e. the noise suppression position, movement of the operating rod 185 towards the right hand side of FIGURE 10A moves the downstream end of the segment 141 towards the longitudinal axis of the bullet 140 and the pins 180 into engagement with the slots 181 in the segments 143. The linkage 183 pulls the fork member 177 out of the slides 179 and the segments 141 are free to pivot about the downstream end of the bullet by means of the engagement of the pivot pins 180 in the slots 181. Thus each segment 141 is pivoted about its downstream end and assumes the position as shown in broken line in FIGURE 10. The segments 141, therefore, petal out from the point of the bullet to act as thrust reversing vanes and to deflect the jet stream outwardly and forwardly. The streamline position of the bullet is obtained with the pivot pins 180 resting in the slots 181 and the shaft 175 resting in the half bearings 176. The noise suppression position of the bullet is obtained by a movement of the control rod 185 to the left of the figure whereupon the pivot pins 180 are withdrawn from the slots 181 and the segment 141 assumes the noise suppression position as shown in full line in FIGURE 10.

What I claim is:

1. A combined noise suppression and thrust reversal nozzle for an aircraft jet propulsion engine located in the region of the exit of the propulsive stream, the nozzle having a longitudinal axis and the periphery of the nozzle including a number of elements, each of the elements having an upstream and a downstream end, mountings for said elements at both of said ends and a mechanism for adjusting the elements into a first position in which the downstream ends of each of a pair of adjacent elements are spaced apart from one another relative to the longitudinal axis, a second position in which the downstream ends of the elements are equidistant from the longitudinal axis and a third position in which the upstream ends of the elements are moved outwardly away from and the downstream ends moved towards the longitudinal axis.

2. A combined noise suppression and thrust reversal nozzle for an aircraft jet propulsion engine located in the region of the exit of the propulsive stream, the nozzle having a longitudinal axis and including a number of wall members spaced apart from one another around the propulsive stream and extending outwardly away from said axis, a number of elements, the elements bridging the distance between adjacent wall members, a mounting for each alternate element, the mountings permitting movement of alternate elements relative to their associated wall members, a mounting for the wall members, the mountings permitting movement of the wall members towards and away from the longitudinal axis of the nozzle and a mechanism attached to each alternate element and its associated wall members for adjusting the configuration of the nozzle from a position in which the downstream ends of alternate ones of said adjustable elements are in an outer most position and the downstream ends of intermediate adjustable elements are in an inner most position to a second position in which the adjustable elements are substantially equidistant from the longitudinal axis of the nozzle and a third position in which the downstream end of the adjustable elements and the side walls are moved towards the longitudinal axis of the nozzle and the upstream end of each of the adjustable elements moved away from and clear from their associated side walls.

3. A noise suppression nozzle through which the propulsive gas stream of a jet propulsion engine is to be issued, the nozzle having a longitudinal axis and including a number of pivotally mounted elements forming a part of the periphery of the nozzle, each element having a longitudinal axis and means to adjust the inclination of the longitudinal axes of certain of these elements in one direction and of other elements in the opposite direction with respect to the longitudinal axis of the nozzle, without resultant change of nozzle outlet area, from a noise suppression position, in which the longitudinal axes of the elements are inclined to the longitudinal axis of the nozzle in such a manner that the cross-sectional shape of the propulsive gas stream leaving the nozzle exit is deeply indented to form corrugations, to a relatively less effective noise suppression position in which the elements co-operate with the remainder of the periphery of the nozzle to form a boundary for the propulsive gas stream before it leaves the downstream end of the nozzle and in which position, the longitudinal axes of the elements are inclined to the longitudinal axis of the nozzle in such a manner that the cross-sectional shape of the propulsive gas stream leaving the nozzle exit is indented to a reduced extent as compared with the noise suppression nozzle position.

4. The structure of claim 3, wherein said nozzle is substantially circular in cross-section and the oppositely adjusted pivotally mounted elements are in alternating relationship.

5. The structure of claim 3, wherein said nozzle is substantially rectangular in cross-section and the oppositely adjusted pivotally mounted elements are in opposing portions of the nozzle periphery.

6. A noise suppressing nozzle through which the propulsive gas stream of an aircraft jet propulsion, rocket or like engine is to be issued, comprising a substantially frusto-conical body having radially thereon a plurality of pairs of outwardly directed side wall members, a plurality of web-like elements, one arranged within each pair of side wall elements, and each web-like element being adapted to swing about a point spaced upstream of the exit plane of the nozzle, inwardly and outwardly in alternating sequence, stop members located on each pair of side elements to permit the said web-like elements to adopt a position mutually distant from the centre of the propulsive stream whereby to provide an exit nozzle approximating to a circle in cross-section, and a position whereby alternate web elements are located at or near the bottom of the said side wall elements and at or near the top of the said side wall elements whereby to produce a substantially petal form or substantially a star form for noise suppression purposes.

7. A noise suppressing nozzle through which the propulsive gas stream of an aircraft jet propulsion, rocket or like engine is to be issued, comprising fixed wall portions and movable wall portions cooperating with the fixed wall portions and movable to at least two positions, one, a cruising position, in which the movable wall portions define with the fixed wall portions a substantially rectangular configuration, at least one movable wall portion on each of the four sides of the rectangle, the movable wall portions on the two opposite sides being of substantially U-shaped cross-section and being movable inwardly to a silencing position in which the closed portion of the U enters the jet stream, and the movable wall portions on the other two opposed sides of the rectangle are movable outwardly, the fixed wall portions including outwardly directed flanges cooperating with the outwardly movable wall portions, whereby the exit area of the nozzle is substantially the same in either silencing or cruising position.

8. A combined noise suppressor and thrust reverser for jet aircraft comprising a substantially cylindrical nozzle provided with a plurality of corrugations about its periphery, said nozzle having a cut-away portion to form a "clam-shell" exit, said nozzle being longitudinally divided into two half nozzles, a pair of diametrically opposed nozzle supporting members located on either side and to which the two half nozzles are pivoted, said two half nozzles being transversely divided along a line passing through the pivot point thereof so as to subdivide the outermost portions of the two half nozzles into visor-like configurations, said visor-like elements being pivoted at a point concentric with the point of pivot of the two half nozzles, means being provided to swing both visor-like elements about their pivot points inwardly of the said propulsive stream whereby the corrugations enter a substantial distance into the said stream to cause the suppression of noise emitting therefrom, and means for pivoting the two half nozzles including the visor-like elements about the said pivot point so that the outermost points of the nozzles meet at the centre of the jet stream and their upstream ends provide exhaust ports, whereby to cause the reversal of the thrust of the engine.

References Cited in the file of this patent

UNITED STATES PATENTS

| 2,664,700 | Benoit | Jan. 5, 1954 |
| 2,753,684 | Greene | July 10, 1956 |
| 2,803,944 | Kroon | Aug. 27, 1957 |
| 2,841,956 | Gunson et al. | July 8, 1958 |
| 2,886,946 | Parker | May 19, 1959 |
| 2,952,124 | Pearson | Sept. 13, 1960 |
| 2,990,029 | Keen | June 27, 1961 |

FOREIGN PATENTS

| 165,369 | Australia | Sept. 26, 1955 |
| 220,505 | Australia | Nov. 7, 1957 |
| 558,986 | Belgium | July 31, 1957 |
| 1,164,936 | France | May 19, 1958 |